(12) United States Patent
Comstock et al.

(10) Patent No.: US 10,808,293 B2
(45) Date of Patent: Oct. 20, 2020

(54) HIGH FORMABILITY DUAL PHASE STEEL

(71) Applicant: AK Steel Properties, Inc., West Chester, OH (US)

(72) Inventors: Robert J. Comstock, Trenton, OH (US); George A. Paraskos, Mason, OH (US)

(73) Assignee: AK Steel Properties, Inc., West Chester, OH (US)

(*) Notice: Subject to any disclaimer, the term of this patent is extended or adjusted under 35 U.S.C. 154(b) by 467 days.

(21) Appl. No.: 15/211,467

(22) Filed: Jul. 15, 2016

(65) Prior Publication Data

US 2017/0016087 A1    Jan. 19, 2017

Related U.S. Application Data

(60) Provisional application No. 62/192,897, filed on Jul. 15, 2015.

(51) Int. Cl.
| | | |
|---|---|---|
| *C21D 9/52* | (2006.01) | |
| *C21D 8/02* | (2006.01) | |
| *C21D 9/60* | (2006.01) | |
| *C21D 1/42* | (2006.01) | |

(52) U.S. Cl.
CPC ............ *C21D 9/52* (2013.01); *C21D 8/0205* (2013.01); *C21D 8/0226* (2013.01); *C21D 8/0236* (2013.01); *C21D 8/0247* (2013.01); *C21D 8/0278* (2013.01); *C21D 8/0284* (2013.01); *C21D 9/60* (2013.01); *C21D 1/42* (2013.01); *C21D 2211/003* (2013.01); *C21D 2211/005* (2013.01); *C21D 2211/008* (2013.01); *Y02P 10/253* (2015.11)

(58) Field of Classification Search
None
See application file for complete search history.

(56) References Cited

U.S. PATENT DOCUMENTS

| | | |
|---|---|---|
| 3,923,560 A | 12/1975 | Regitz |
| 4,473,411 A | 9/1984 | Hook et al. |
| 4,561,909 A | 12/1985 | Sunami et al. |

(Continued)

FOREIGN PATENT DOCUMENTS

| | | |
|---|---|---|
| CN | 101497972 A | 8/2009 |
| CN | 104350166 A | 2/2015 |

(Continued)

OTHER PUBLICATIONS

Hanlon et al.; Effects of Tempering on the Mechanical Properties of High Strength Dual-Phase Steels; Materials Science and Engineering A 538; 35-41; 2012.*

(Continued)

*Primary Examiner* — Guinever S Gregorio
(74) *Attorney, Agent, or Firm* — Frost Brown Todd LLC (57) ABSTRACT

To improve the formability of dual phase steels, the martensite phase is tempered. It may form a ferrite-carbide structure. The tempering step occurs after martensite has been formed in the dual phase steel. The tempering step can occur in a box annealing step or it can be performed in a continuous fashion, such as on a continuous annealing, continuous tempering heat treating, or continuous coating line. The tempering step can further comprise a temper rolling on a temper mill after the heating step.

7 Claims, 4 Drawing Sheets

(56) References Cited

U.S. PATENT DOCUMENTS

| | | | |
|---|---|---|---|
| 4,981,531 | A | 1/1991 | Katoh et al. |
| 6,024,276 | A | 2/2000 | Hirata et al. |
| 6,159,312 | A | 12/2000 | Koo et al. |
| 6,695,932 | B2 | 2/2004 | Kami et al. |
| 7,101,445 | B2 | 9/2006 | Kami et al. |
| 7,117,925 | B2 | 10/2006 | Strezov et al. |
| 8,298,353 | B2 | 10/2012 | Saha et al. |
| 8,741,075 | B2 | 6/2014 | Imai et al. |
| 9,039,847 | B2 | 5/2015 | Ono et al. |
| 9,074,271 | B2 | 7/2015 | Teraoka et al. |
| 9,324,268 | B2 | 4/2016 | Soni et al. |
| 9,605,335 | B2 | 3/2017 | Nakaya et al. |
| 2003/0129444 | A1 | 7/2003 | Matsuoka et al. |
| 2012/0177527 | A1 | 7/2012 | Kerrigan et al. |
| 2015/0144231 | A1* | 5/2015 | Masuda .......... C21D 9/46 148/603 |

FOREIGN PATENT DOCUMENTS

| | | |
|---|---|---|
| CN | 104364403 A | 2/2015 |
| JP | 2004-256872 | 9/2004 |
| RU | 2341566 C2 | 12/2008 |
| TW | 201016862 A1 | 5/2010 |

OTHER PUBLICATIONS

Rourkela; A Project Report on Heat Treatment of Low Carbon Steel; 2008.*

Sisson et al.; Carbon Diffusion in the Steels: A Numerical Analysis Based on Direct Integration of the Flux; Journal of Phase Equilibria and Diffusion; 27, 6, 598-604; 2006.* https://www.keenovens.conn/info/heat_treatment_steel.html; Mar. 6, 2020.*

Comstock, R.J., et al., "Hole expansion in a variety of sheet steels," Journal of Materials Engineering and Performance, Dec. 2006, 15(6):675-683.

Comstock, R.J., et al., "Predicting Formability of Sheared Holes in a Variety of Sheet Steels," Materials Science and Technology, 2011, pp. 662-675, 14 pgs.

Davies, R.G., "Edge Cracking in High Strength Steels," J. Applied Metalworking, Jan. 1983, 2(4):293-299, 7 pgs.

Fang, X., et al., "Effects of tempering temperature on tensile and hole expansion properties of C—Mn steel," Journal of Materials Processing Technology, 2003, 132:215-218, 4 pgs.

Nishimoto, A., et al., "Relation Between Hole Expansion Formability and Metallurgical Factors in Dual-Phase Steel Sheet," Fundamentals of Dual-Phase Steel, Eds. R.A. Kot and B.L. Bramfilt, The Metallurgical Society of AIME, 1981, pp. 447-463, 18 pgs.

Baltazar Hernandez, V.H., "Tempering of Martensite in Dual-Phase Steels and Its Effects on Softening Behavior," Metallurgical and Materials Transactions A, May 28, 2011, 42(10):3115-3129, 15 pgs.

Gunduz, S., "Effects of chemical composition, martensite volume fraction and tempering on tensile behaviour of dual phase steels," Materials Letters, Nov. 15, 2009, 63(27):2381-2383, 3 pgs.

Kamp, A., "Effects of tempering on the mechanical properties of high strength dual-phase steels," Materials and Engineering A: Structural Materials: Properties, Microstructures and Processing, Jan. 4, 2012, 538(4):35-41, 7pgs.

International Search Report and Written Opinion dated Oct. 7, 2016 for Application No. PCT/US2016/042508, 9 pages.

Australian Office Action dated Nov. 18, 2018 for Application No. 2016293582, 3 pgs.

Canadian Office Action dated Dec. 19, 2018 for Application No. 2,991,135, 4 pgs.

Chinese Office Action dated Nov. 14, 2018 for Application No. 2016880411576, 20 pgs.

Colombian Office Action dated Jan. 23, 2018 for Application No. NC/2018/0000243, 3 pgs.

European Communication dated Feb. 22, 2018 for Application No. 16745301.8, 3 pgs.

European Communication dated Jan. 21, 2019 for Application No. 16745301.8, 4 pgs.

Russian Office Action dated Dec. 2, 2018 for Application No. 20168101731, 9 pgs.

Taiwanese Office Action dated Oct. 19, 2017 for Application No. 105122448, 9 pgs.

Fukuoka, K. et al, "Examination of Surface Hardening Process for Dual Phase Steel and Improvement of Gear Properties," JFE Technical Report, No. 15, May 2010, pp. 17-23, 7 pgs.

Canadian Office Action dated Jun. 19, 2019 for Application No. 2,991,135, 4 pgs.

Chinese Office Action dated Apr. 19, 2019 for Application No. 201680041157.6, 23 pages.

Japanese Office Action dated Jun. 4, 2019 for Application No. 2018-501871, 6 pages.

Korean Office Action dated Jul. 8, 2019 for Application No. 10-2018-7004652, 11 pages.

Russian Office Action dated Apr. 25, 2019 for Application No. 2018101731, 9 pages.

* cited by examiner

HIGH FORMABILITY DUAL PHASE STEEL

PRIORITY

This application claims priority to U.S. Provisional Application Ser. No. 62/192,897, entitled HIGH FORMABILITY DUAL PHASE STEEL filed on Jul. 15, 2015, the disclosure of which is incorporated by reference herein.

BACKGROUND

Dual phase steels are well-known and widely used in applications that require high strength steels such as automotive applications. They typically comprise ferrite and martensite phases. These steels are considered to have limited formability with respect to bending and to edge stretching, which is typically measured using the known method of hole expansion.

During bending or edge stretching of a standard dual phase steel, the martensite phase undergoes little deformation, thus leaving the ferrite to accommodate most of the strain. As the strain increases, the ferrite begins to reach the limits of its ductility and voids begin to form at the ferrite-martensite interfaces. The voids then can form cracks as the strain further increases.

SUMMARY

To improve the formability of dual phase steels, the martensite phase is tempered. It may form a ferrite-carbide structure. The tempered martensite structure has lower strength than the original martensite. This lower strength allows the strain in the bending or stretching steel to be more uniformly distributed throughout the material, thereby minimizing void formation in the material.

In one embodiment, the tempering step is performed in a box annealing step. The box annealing step occurs after martensite has been formed in the dual phase steel. For example, it can occur after heat treatment in a continuous annealing line, or it can occur after the steel has been heat treated and coated in a hot dip line, for example with a metal coating such as aluminum, zinc, lead, or an alloy of one or more of these metals.

In another embodiment, the tempering step is performed in a continuous fashion, such as on a continuous annealing, continuous tempering heat treating, or continuous coating line after the formation of martensite. The heat for the tempering step can be provided by induction heaters or other strip heating methods.

In some embodiments, the tempering step can further comprise a temper rolling on a temper mill after the heating step.

DETAILED DESCRIPTION

The martensite phase in dual phase steel is tempered, using time at temperature, transforming some or all of the martensite to ferrite and cementite. Cementite is carbide. The time and temperature of the tempering heat treatment must be long enough and hot enough to promote that transformation such that the hole expansion and bending test values improve the desired amount. The time and temperature of the heat treatment must not be so long, nor so high, that the material tensile strength decreases below desired minimum values, or the material's yield strength increases above desired maximum values. The exact time and temperature for any given tempering step is able to be determined by one skilled in the art following the teachings of this application. The tempering step comprises heating the steel strip. The tempering step may further comprise a temper rolling after the heating step.

Tempering is controlled by diffusion of carbon and is dependent on the time at temperature. A cumulative diffusion distance of carbon in cm, x, can be used to define the magnitude of tempering:

$$x=(2Dt)^{1/2}$$

where t is the time, in seconds, at temperature and D is the diffusivity in $cm^2/s$.

x, a function of time (t) and Temperature (T), can be the sum of $x_n$ values under various time and temperature conditions:

$$x=x_1(t_1,T_1)+x_2(t_2,T_2)+x_3(t_3,T_3)+\ldots+x_n(t_n,T_n)$$

The diffusivity is defined by the following Arrhenius type equation:

$$D=D_o e^{-Q/RT}$$

where
Q is the activation energy=32,000 cal/mol,
$D_o$=0.15 $cm^2/s$,
R=1.987 cal/(mol K),
and T is the temperature in Kelvin.

While increased tempering improves formability, it also increases the steel's yield strength and introduces yield-point elongation (YPE). Steel users have yield strength requirements for the various classes of dual phase steels. As a result, the amount of tempering may need to be limited to adhere to yield strength requirements. The diffusion distance, x, is correlated with yield strength for two dual phase steel classes, DP780 and DP980. Therefore, heat treatments can be developed using the above equations that will give maximum tempering, which will give the best formability, while staying within the required yield strength range.

In one embodiment, a coil of dual phase steel strip is subject to a tempering heat treatment using standard steel production box annealing equipment or baking type equipment for steel coils after the appropriate martensite-ferrite microstructure has been developed. Alternatively, this box tempering, using box annealing equipment, may occur after the steel strip has been coated, for example with zinc, aluminum, lead, or an alloy of one or more of these coatings. Such coating can be applied by any conventional process, including electrolytic or hot dip coating methods. The box annealing can occur after, or be combined with, subsequent heat treatments, such as the alloying of a zinc coating with the base dual phase steel to create a galvannealed coating. After the box annealing, the steel strip may also be temper rolled to improve the shape of the strip, to remove yield point elongation, or to oil the strip. For certain embodiments, and particularly for dual phase steels, such box annealing is suitable for tempering.

In another embodiment, the tempering heat treatment can be applied using a continuous process, such as a continuous annealing line or a continuous coating line or a continuous heat treating line. In one embodiment, the continuous heating process comprises induction heating. As with the box anneal process, the continuous tempering heat treatment step can occur after the steel strip has been cold rolled, or after it has been coated. The continuous tempering heat treatment can also be followed by a temper rolling step.

Example 1

Figure 1:
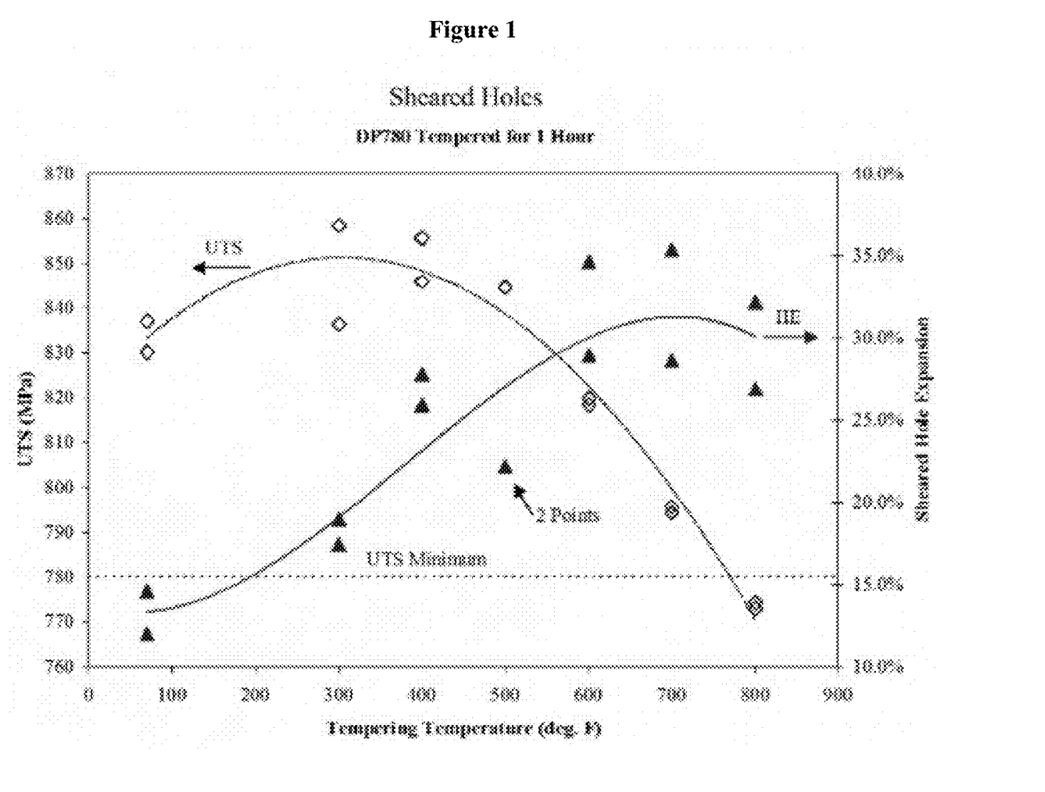
FIG. 1 depicts the improved hole expansion ratio for dual phase steel strip with a tensile strength of 780 MPa as a function of temperature.

Dual phase steel with a nominal tensile strength of 780 MPa was manufactured using a typical process for such dual phase steel strip. After cold rolling and galvanizing, the steel strip was subject to a one-hour laboratory anneal cycle at various temperatures in a dry nitrogen atmosphere. The resulting improved hole expansion is shown in FIG. 1.

Example 2

Two coils of dual phase steel with a nominal tensile strength of 780 MPa were manufactured using a typical manufacturing process for such dual phase steel strip. After cold rolling and galvanizing, the two coils were subject to a box anneal cycle at 550° F. for 24 and 30 hours respectively in a dry nitrogen gas atmosphere. The results are reported in Table 1 below:

TABLE 1

| Temperature (° F.) | Temper Time (hrs) | YPE (%) | Yield Strength (MPa) | Tensile Strength (MPa) | Hole Expansion Ratio (%) |
|---|---|---|---|---|---|
| Standard Product | 0 | 0 | 512 | 855 | 16 |
| 550 | 24 | 0.5 | 608 | 811 | 32 |
| 550 | 30 | 1.8 | 740 | 834 | 47 |

The 24 hour cycle had low yield-point elongation (YPE) and a yield strength close to that of the standard product, but double the hole-expansion ratio (HER). A longer tempering time of 30 hours further increased the HER, but significantly increase the amount of YPE and the yield strength.

Example 3

Two coils of a dual phase steel with a nominal tensile strength of 980 MPa were manufactured using a typical manufacturing process for such dual phase steel strip. After cold rolling and galvanizing, the two coils were subjected to a box anneal cycle at 550° F. for 30 hours in dry nitrogen gas atmosphere. After box annealing, the coils were temper rolled on a temper mill to 0.27% maximum, and 0.12% average.

Hole Expansion Tests.

Using a hemispherical punch test with a ¾ inch diameter sheared hole, the average hole expansion increased from 14% in the dual phase steel before the tempering treatment to 31% after the tempering treatment. Using a conical punch test with a 10 mm sheared hole, the average hole expansion increased from 16% in the dual phase steel before the tempering treatment to 29% after the tempering treatment. The average diameter of the expanded hole was determined from an average of the longitudinal, transverse, diagonal 1 and diagonal 2 diameters. The percent hold expansion at failure was determined using an average of the three samples. The piercing die clearance was 17% in the ¾ inch samples and 12.8% in the 10 mm samples. These results are listed in Table 2.

TABLE 2

| | Thickness (inches) | Hole Expansion (%) (¾ inch diameter sheared hole) | Hole Expansion (%) (10 mm diameter sheared hole) |
|---|---|---|---|
| Before Tempering with Box Annealing Equipment | | | |
| AAA Front | 0.0559 | 10 | 16 |
| AAA Tail | 0.0564 | 17 | 17 |
| ABA Front | 0.0556 | 18 | 16 |
| ABA Tail | 0.0557 | 9 | 14 |
| Average: | | 14 | 16 |
| After Tempering with Box Annealing Equipment | | | |
| AAA Front | 0.0560 | 33 | 33 |
| | | 32 | 26 |
| AAA Tail | 0.0560 | 30 | 34 |
| | | 33 | 29 |
| AAA Cold Spot | 0.0558 | 33 | 29 |
| ABA Front | 0.0558 | 32 | 25 |
| | | 26 | 26 |
| ABA Tail | 0.0555 | 34 | 28 |
| | 0.0561 | 28 | 27 |
| ABA Cold Spot | 0.0557 | 31 | 30 |
| Average: | | 31 | 29 |

Tensile Properties.

The average longitudinal tensile strength in the dual phase steel after standard processing was 151 ksi (1040 MPa). This strength dropped to an average of 144 ksi (995 MPa) after the tempering treatment. No sample had a tensile strength below 143 ksi (986 MPa). Details are reported in Table 3 below. Transverse tensile strength in the dual phase steel strip averaged 154 ksi (1062 MPa). This strength dropped to 148 ksi (1018 MPa). Details are reported in Table 4 below.

Figure 2:
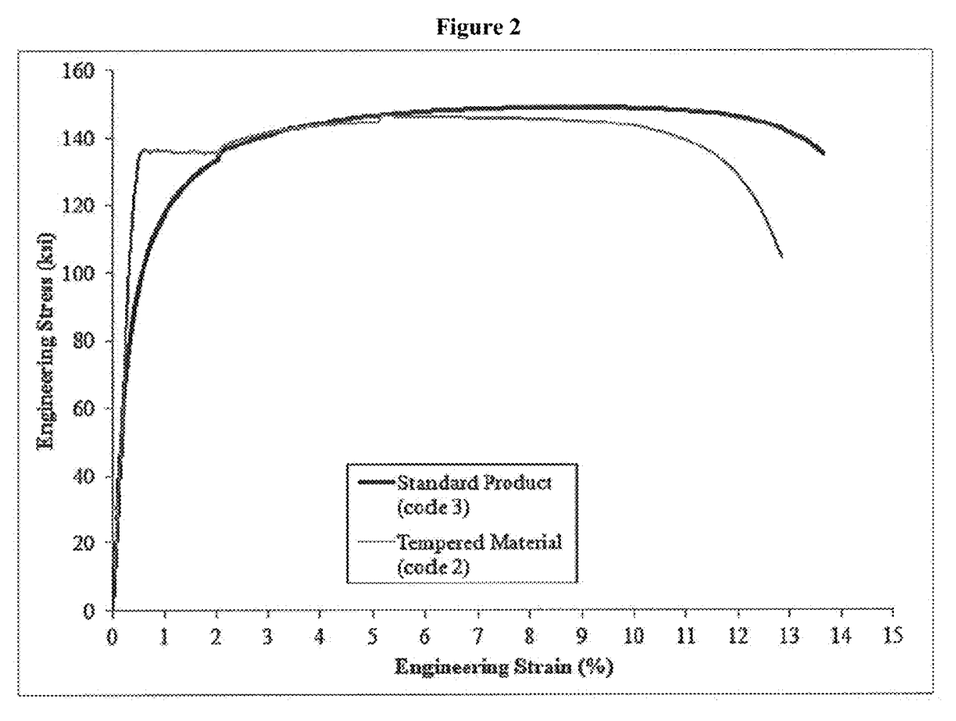
FIG. 2 shows a stress-strain curve for dual phase steel strip with a tensile strength of 980 MPa without a tempering heat treatment and after a tempering heat treatment in box annealing furnace in accordance with one embodiment.

After the tempering treatment, a 1 to 2% yield point elongation ("YPE") developed and the yield strength increase from 95 to 135 ksi (655 to 931 MPa). The total elongation also dropped from 16% in the dual phase steel without any tempering treatment to 13% after the tempering treatment. These results are also listed in Tables 3 and 4. Examples of stress-strain curves for both the standard and tempered products are shown in FIG. 2.

TABLE 3

Longitudinal Tensile Properties

| | | YPE (%) | YS (ksi) Upper | YS (ksi) Lower | YS (ksi) 0.2% | TS (ksi) | TS (MPa) | Elong. (%) |
|---|---|---|---|---|---|---|---|---|
| Before Tempering with Box Annealing Equipment | | | | | | | | |
| AAA | Front | 0 | N/A | N/A | 93.1 | 150.6 | 1039 | 16 |
| AAA | Tail | 0 | N/A | N/A | 98.6 | 151.8 | 1047 | 16 |
| ABA | Front | 0 | N/A | N/A | 95.0 | 152.2 | 1050 | 16 |
| ABA | Tail | 0 | N/A | N/A | 95.6 | 149.4 | 1030 | 16 |
| | Average: | 0 | | | 95.6 | 151.0 | 1041 | 16 |
| After Tempering with Box Annealing Equipment | | | | | | | | |
| AAA | Front | 1.8 | 135.6 | 134.3 | 135.5 | 143.0 | 986 | 14 |
| | | 2.0 | 137.6 | 136.3 | 137.1 | 144.3 | 995 | 13 |
| AAA | Tail | 1.1 | 132.7 | 131.7 | 132.6 | 144.8 | 998 | 14 |
| | | 1.1 | 132.9 | 132.0 | 132.8 | 144.5 | 997 | 14 |
| AAA | Cold Spot | 0.9 | 134.4 | 133.0 | 134 | 144.9 | 999 | 13 |
| ABA | Front | 1.7 | 134.7 | 133.7 | 134.5 | 144.3 | 995 | 14 |
| | | 1.6 | 134.4 | 132.9 | 134.2 | 143.0 | 986 | 13 |
| ABA | Tail | 1.1 | 134.3 | 133.5 | 134.4 | 145.0 | 1000 | 13 |
| | | 1.6 | 136.4 | 134.7 | 136.4 | 145.9 | 1006 | 13 |
| ABA | Cold Spot | 1.0 | 132.7 | 131.5 | 132.4 | 142.9 | 986 | 14 |
| | Average: | 1.4 | 134.6 | 133.4 | 134.4 | 144.3 | 995 | 13 |

TABLE 4

Transverse Tensile Properties

| | | YPE (%) | YS (ksi) Upper | YS (ksi) Lower | YS (ksi) 0.2% | TS (ksi) | TS (MPa) | Elong. (%) |
|---|---|---|---|---|---|---|---|---|
| Before Tempering with Box Annealing Equipment | | | | | | | | |
| AAA | Front | 0 | N/A | N/A | 94.4 | 153.3 | 1057 | 15 |
| AAA | Tail | 0 | N/A | N/A | 94.1 | 153.0 | 1055 | 15 |
| ABA | Front | 0 | N/A | N/A | 97.8 | 156.1 | 1077 | 14 |
| ABA | Tail | 0 | N/A | N/A | 94.2 | 153.6 | 1059 | 15 |
| | Average: | 0 | | | 95.1 | 154.0 | 1062 | 15 |
| After Tempering with Box Annealing Equipment | | | | | | | | |
| AAA | Front | 1.6 | 138.6 | 137.6 | 138.4 | 146.1 | 1008 | 13 |
| | | 1.6 | 138.7 | 138.0 | 138.6 | 146.4 | 1010 | 13 |
| AAA | Tail | 1.1 | 134.1 | 133.5 | 134.0 | 146.7 | 1012 | 14 |
| | | 1.0 | 132.9 | 131.8 | 132.7 | 146.4 | 1010 | 13 |
| AAA | Cold Spot | 0.6 | 134.3 | 134.1 | 134.1 | 149.5 | 1031 | 14 |
| ABA | Front | 1.5 | 136.7 | 135.5 | 136.8 | 146.2 | 1008 | 13 |
| | | 1.4 | 137.0 | 136.3 | 137.1 | 146.9 | 1013 | 14 |
| ABA | Tail | 1.6 | 140.2 | 139.3 | 140.2 | 150.1 | 1035 | 12 |
| | | 1.6 | 140.5 | 139.9 | 140.5 | 149.3 | 1030 | 14 |
| ABA | Cold Spot | 0.5 | 133.2 | 132.8 | 133.0 | 148.9 | 1027 | 13 |
| | Average: | 1.3 | 136.6 | 135.9 | 136.5 | 147.7 | 1018 | 13 |

90° Bend Test.

Before the tempering treatment, the dual phase steel could withstand a minimum r/t of 2.5 before exhibiting a crack that was visible without the aid of a microscope. "r/t" is radius of the bend divided by the thickness of the steel strip. After the tempering treatment, the dual phase steel did not exhibit visible cracks at r/t of 1.2, which was the smallest radius die available. These tests were run in the "hard" direction, i.e., the bend axis runs parallel to the rolling direction. The results are given in Table 5.

TABLE 5

| | | 90° Bend Test | | | | | | |
|---|---|---|---|---|---|---|---|---|
| | | 2.8 r/t (4.0 mm die) | 2.5 r/t (3.5 mm die) | 2.1 r/t (3.0 mm die) | 1.8 r/t (2.5 mm die) | 1.4 r/t (2.0 mm die) | 1.2 r/t (1.75 mm die) | zero-T |
| Before Tempering with Box Annealing Equipment | | | | | | | | |
| IAAA | Front | Pass | Pass | Fail | Fail | Fail | | |
| AAA | Tail | Pass | Pass | Pass | Fail | Fail | | |
| ABA | Front | Pass | Pass | Fail | Fail | Fail | | |
| ABA | Tail | Pass | Pass | Edge crack | Fail | Fail | | |
| After Tempering with Box Annealing Equipment | | | | | | | | |
| AAA | Front | Pass | | Pass | Pass | Pass | Pass | |
| | | Pass | | Pass | Pass | Pass | Pass | |
| AAA | Tail | Pass | | Pass | Pass | Pass | Pass | |
| | | Pass | | Pass | Pass | Pass | Pass | |
| AAA | Cold Spot | | | | | | Pass | |
| ABA | Front | Pass | | Pass | Pass | Pass | Pass | |
| | | Pass | | Pass | Pass | Pass | Pass | |
| ABA | Tail | Pass | | Pass | Pass | Pass | Pass | Fail |
| | | Pass | | Pass | Pass | Pass | Pass | |
| ABA | Cold Spot | | | | | | Pass | |

Scanning Electron Microscopy.

The ferrite-martensite structure in the particular dual phase steel of this example is typically very fine and not easily resolved using an optical microscope. After the tempering treatment, the transformation of the martensite to ferrite and carbides was resolved using a scanning electron microscope.

Summary

The box anneal tempering treatment of the two dual phase steel coils doubled the hold expansion capabilities, from 15% to 30%, and greatly improved the bending properties while maintaining the minimum tensile strength of 142 ksi (980 MPa). Tempering did return YPE into the product, which resulted in an increase in the average yield strength from 96 to 135 ksi (662 to 931 MPa)

Example 4

The higher temperatures in the particular box annealing equipment used for testing resulted in some variation and elevated yield strengths in the final results for dual phase steel with a nominal tensile strength of 980 MPa, as seen in the results reported in Table 6 below:

TABLE 6

| Temperature (° F.) | Temper Time (hrs) | YPE (%) | Yield Strength (MPa) | Tensile Strength (MPa) | Hole Expansion Ratio (%) |
|---|---|---|---|---|---|
| Standard Product | 0 | 0 | 659 | 1041 | 16 |
| 450 | 9 | 1.2 | 1038 | 1128 | |
| 550 | 10 | 1.8 | 881 | 966 | |
| 550 | 30 | 1.4 | 920 | 995 | 29 |

Example 5

The tempering behavior of dual phase steel with a nominal tensile strength of 980 MPa was better controlled with lower tempering temperatures, in the laboratory, which may then require longer tempering times, as shown in Table 7 below:

TABLE 7

| Temperature (° F.) | Temper Time (hrs) | YPE (%) | Yield Strength (MPa) | Tensile Strength (MPa) |
|---|---|---|---|---|
| Standard Product | 0 | 0 | 681 | 1029 |
| 220 | 24 | 0 | 684 | 1008 |
| 265 | 24 | 0 | 695 | 1035 |
| 285 | 24 | 0 | 741 | 1041 |

Example 6

A tempering heat treatment was conducted on a dual phase steel having nominal tensile strength of 980 MPa on a paint line using its induction heaters. The temperature of the strip was measured on exiting of the induction heaters and before coiling. Three conditions were investigated and described in Table 8:

TABLE 8

| Temperature out of Inductors (° F.) | Coiling Temperature (° F.) | YPE (%) | Yield Strength (MPa) | Tensile Strength (MPa) |
|---|---|---|---|---|
| Standard Product | 0 | 0 | 689 | 1058 |
| 590 | 115 | 1.8 | 973 | 1051 |
| 600 | 250 | 2.1 | 989 | 1058 |
| 700 | 275 | 2.6 | 991 | 1033 |

As the strip temperature out of the inductors and coiling temperature is decreased, so does the yield strength and the amount of YPE. The strip temperature control of such a continuous process will allow the yield strength and YPE to be lowered down to the original yield strength and zero YPE if desired.

Example 7

Figure 3:
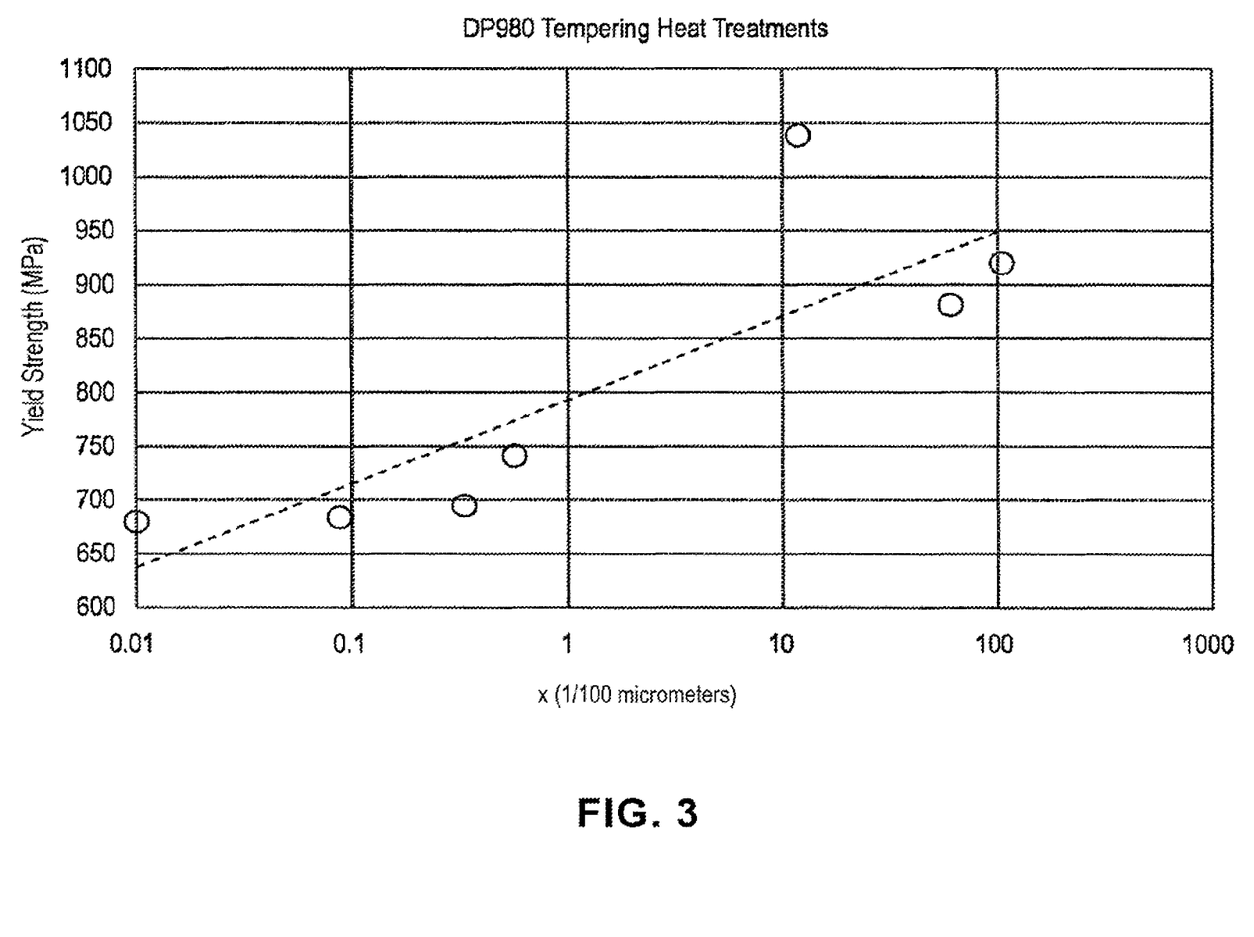
FIG. 3 shows the calculated relationship between the mean diffusion distance of carbon during tempering and yield strength for dual phase steel strip with a tensile strength of 980 MPa.

The dual phase 980 yield strength data in Examples 3, 4, and 5 are plotted as a function of the calculated diffusion distance x, in micrometers, in FIG. 3. Using FIG. 3 and the diffusion equations presented above, a heat treatment can be developed that will produce a tempered product with a desired yield strength for DP980. For example, if a tempered DP980 product having an 800 MPa yield strength is desired, time and temperature combinations can be chosen such that yield x is approximately 1 micrometer. In another example, if a tempered DP980 product have a 950 MPa yield strength is desired, time and temperature combinations can be chosen such that yield $x<1$ micrometers or such that yield $x<0.1$ micrometers.

Example 8

Figure 4:
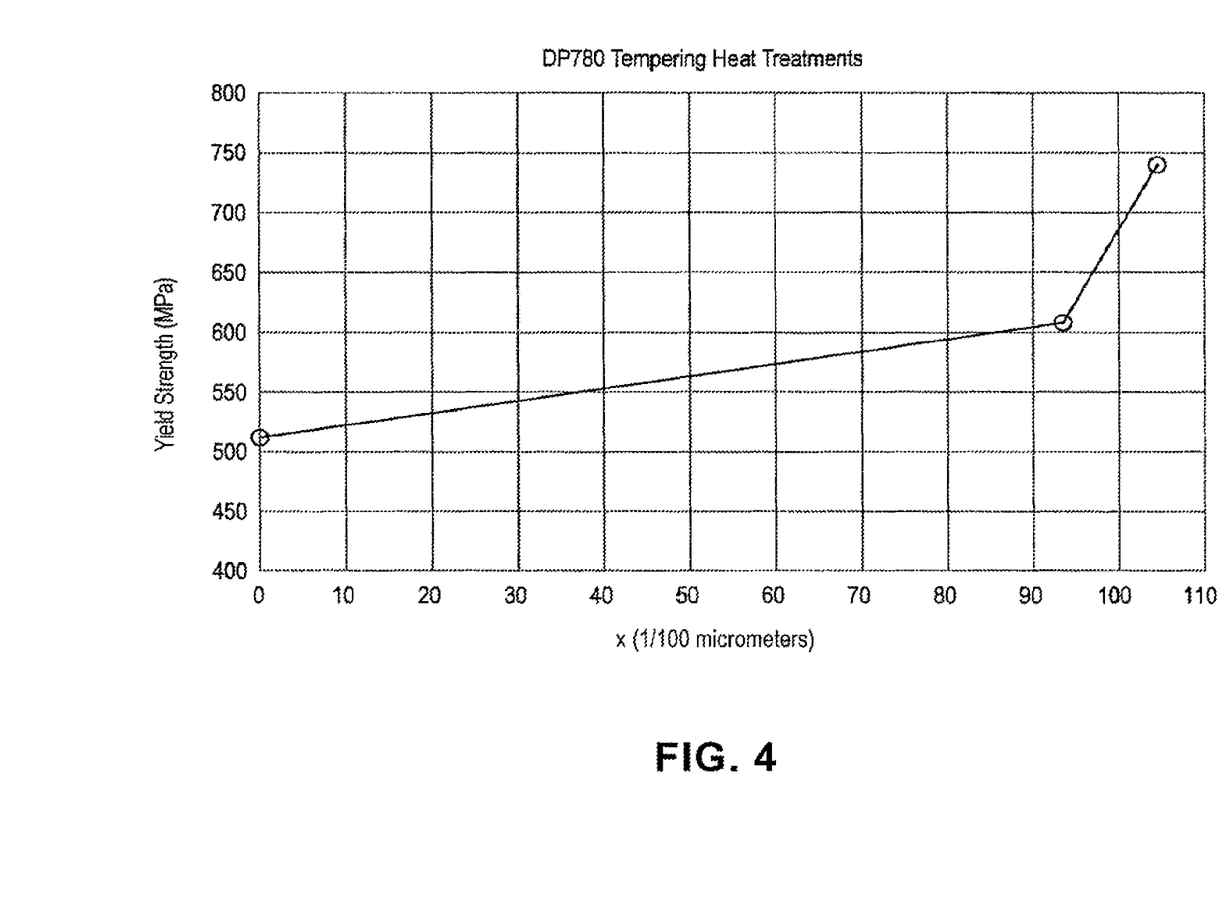
FIG. 4 shows the calculated relationship between the mean diffusion distance of carbon during tempering and yield strength for dual phase steel strip with a tensile strength of 780 MPa.

The dual phase 780 yield strength data in Example 2 are plotted as a function of the calculated diffusion distance x, in micrometers, in FIG. 4. Using FIG. 4 and the diffusion equations presented above, a heat treatment can be developed that will produce a tempered product with a desired yield strength for DP780. For example, if a tempered DP780 product having a 600 MPa, or lower, yield strength is desired, time and temperature combinations need to be chosen such that yield $x<0.9$ micrometers. In another example, if a tempered DP780 product having a 720 MPa yield strength is desired, time and temperature combinations need to be chosen such that yield $x<1.1$ micrometers.

What is claimed is:

1. A method of improving the formability of a dual phase steel strip comprising ferrite and martensite, the method comprising the step of temper heat treating the dual phase steel strip at a temperature and for a time sufficient to transform at least a portion of the martensite to ferrite and cementite, wherein the sufficient time and temperature is defined by a cumulative diffusion distance of carbon disposed within the dual phase steel strip after a batch process that is <1.1 micrometers when the dual phase steel strip has a nominal tensile strength of 780 MPa, or <1 micrometers when the dual phase steel strip has a nominal tensile strength of 980 MPa, wherein the sufficient time is one hour or more.

2. The method of claim 1 further comprising the step of temper rolling the dual phase steel after the temper heat treating step.

3. The method of claim 1 wherein the temper heat treating step occurs after the strip has been cold rolled.

4. The method of claim 1 wherein the temper heat treating step occurs after the strip has been coated with a coating.

5. The method of claim 1 wherein the temper heat treating step is a box annealing step.

6. The method of claim 1 wherein the temper heat treating step is a continuous temper heating step.

7. The method of claim 6 wherein the continuous temper heating is provided by induction heating.

* * * * *